(12) United States Patent  (10) Patent No.: US 8,271,835 B2
Yang et al.  (45) Date of Patent: Sep. 18, 2012

(54) METHOD FOR DIAGNOSING ABNORMAL CONDITIONS IN A SYSTEM BY OBSERVING A COMPUTER SCREEN AND CONSIDERING COMPUTER SCREEN CONFIGURATION COMPLEXITY AND DISTINCTIVENESS

(75) Inventors: Joon-Eon Yang, Daejeon (KR); Won-Dea Jung, Daejeon (KR); Jae-Whan Kim, Daejeon (KR); Jin-Kyun Park, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 757 days.

(21) Appl. No.: 12/344,195

(22) Filed: Dec. 24, 2008

(65) Prior Publication Data

US 2010/0095153 A1    Apr. 15, 2010

(30) Foreign Application Priority Data

Oct. 10, 2008 (KR) .................. 10-2008-0099640

(51) Int. Cl.
 *G06F 11/00* (2006.01)
 *G06F 11/30* (2006.01)
(52) U.S. Cl. ............. 714/37; 714/33; 714/39; 702/188; 702/190; 382/224
(58) Field of Classification Search ............... 714/33, 714/37, 39; 382/159, 181, 220, 224, 225; 702/188, 190
See application file for complete search history.

(56) References Cited

U.S. PATENT DOCUMENTS

| | | | | |
|---|---|---|---|---|
| 5,339,815 A * | 8/1994 | Liu et al. | | 600/437 |
| 6,683,973 B2 * | 1/2004 | Li et al. | | 382/132 |
| 6,694,178 B1 * | 2/2004 | Soula et al. | | 600/523 |
| 6,842,866 B2 * | 1/2005 | Song et al. | | 714/37 |
| 8,006,231 B2 * | 8/2011 | Peipelman et al. | | 717/124 |
| 2007/0083813 A1 * | 4/2007 | Lui et al. | | 715/709 |
| 2007/0234121 A1 * | 10/2007 | He et al. | | 714/33 |
| 2010/0040280 A1 * | 2/2010 | McKnight | | 382/154 |

FOREIGN PATENT DOCUMENTS

| KR | 1020050045717 | 5/2005 |
|---|---|---|
| KR | 1020050045717 A | 5/2005 |

OTHER PUBLICATIONS

S.N. Mohanty, "Entropy metrics for software design evaluation" The Journal of Systems and Software, vol. 2, pp. 39-46, 1981.
M.H. Van Emden, "Hierarchical decomposition of complexity" Machine Intelligence, vol. 5, pp. 361-380, 1970.
A. Tversky, "Features of similarity" Psychological Review, vol. 84, No. 4, pp. 327-352, 1977.

(Continued)

Primary Examiner — Joseph Schell
(74) Attorney, Agent, or Firm — TIPS Group (57) ABSTRACT

The present invention discloses an apparatus and a method for diagnosing abnormal conditions, that quantitatively considers acquisition difficulties between abnormal symptoms provided on a computer screen and quantifies acquisition difficulties of the abnormal symptoms through distinctiveness of measuring devices to exactly diagnose the abnormal conditions even under an improved control environment, making it possible for a user to rapidly and easily diagnose the abnormal conditions that may be generated from a complicated device. With the present invention, the abnormal conditions are diagnosed using the sequential diagnosis technique and the Boolean logic between the abnormal symptoms, making it possible to effectively diagnose the abnormal conditions even under masking effects that may be generated between the abnormal symptoms.

8 Claims, 11 Drawing Sheets

OTHER PUBLICATIONS

J.S. Davis and R.J. Leblanc, "A Study of the applicability of complexity measures," IEEE Transactions on Software Engineering, vol. 14, No. 9, pp. 1366-1372, 1988.

K.S. Lew et al.. "Software complexity and its impact on software reliability" IEEE Transactions on Software Engineering, vol. 14, No. 11, pp. 1645-1655, 1988.

* cited by examiner

SCREEN A

SCREEN B

SCREEN B

METHOD FOR DIAGNOSING ABNORMAL CONDITIONS IN A SYSTEM BY OBSERVING A COMPUTER SCREEN AND CONSIDERING COMPUTER SCREEN CONFIGURATION COMPLEXITY AND DISTINCTIVENESS

This application claims priority to Korean Patent Application No. 10-2008-0099640, filed on Oct. 10, 2008 in the Korean Intellectual Property Office, the entire contents of which are hereby incorporated by reference.

BACKGROUND OF THE INVENTION

1. Field of the Invention

The present invention relates to an apparatus and a method for diagnosing abnormal conditions which are based on a sequential diagnosis technique and Boolean logic between abnormal conditions in order to diagnose abnormal conditions of complicated systems such as a nuclear power plant, a petroleum/chemical factory or the like using a computer and are usable even under an advanced control environment.

2. Description of the Related Art

In order to secure the safety of a large scale complicated system such as a nuclear power plant or the like, a prompt and exact diagnosis must be undertaken when the system is in conditions deviated from the normal (hereinafter, referred to as the abnormal conditions).

Based on such importance, various diagnosis techniques and diagnosis systems have been studied and developed.

However, since most of the diagnosis techniques have very complicated theoretical concepts and need excessive time and costs for accomplishing such a diagnosis system, an effective technique that is helpful to develop the practical diagnosis system is very limited.

Among diagnosis techniques actually applied up to now, the most widely used diagnosis technique is a sequential diagnosis technique capable of proposing a binary tree which can diagnose abnormal conditions through sequential experiments.

The advantage of this technique is to effectively determine the sequence of abnormal symptoms that should be checked to diagnose the abnormal conditions. However, since the existing sequential diagnosis technique has not considered Boolean logic (AND or OR relationship), it is expected that the correct picture of abnormal symptoms could be distorted due to various reasons such as masking effects or interactions caused by the interlocks of complicated systems.

Owing to such disadvantages, not only the amounts of time and effort taken in diagnosing the abnormal conditions are increased but also the user is highly likely to obtain an improper diagnosis. In order to solve such problems, there has been developed a technique capable of considering Boolean logic between abnormal symptoms in the existing sequential diagnosis technique (Korean Patent Registration No. 10-0531033 B1, Nov. 18, 2005).

Figure 1:
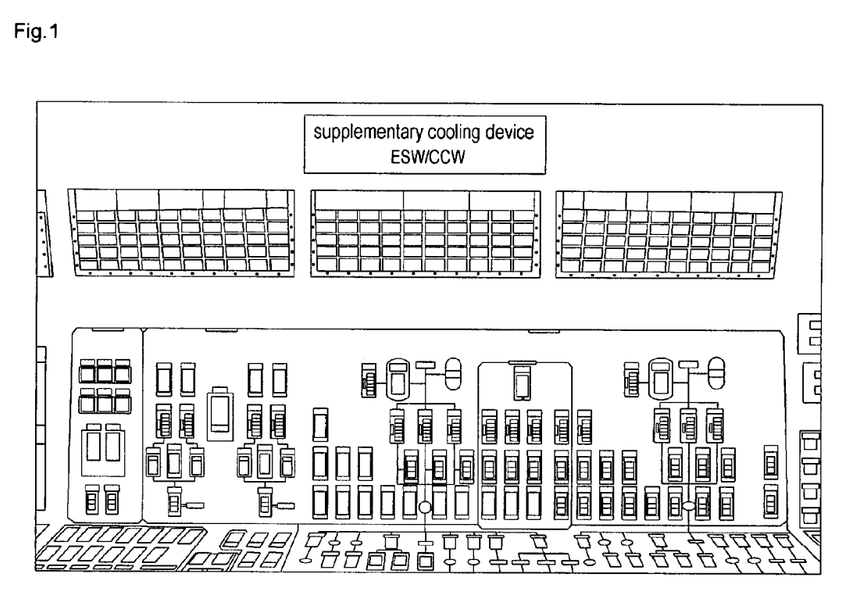
FIG. 1 is a view showing a conventional control environment.

However, the technique developed in the patent considers acquisition difficulties according to abnormal symptoms to be the same. Accordingly, the technique can be used only under the conventional control environment where all of a controller, an alarm tile, an indicator and the like are displayed at the same physical level, as shown in FIG. 1.

Figure 2:
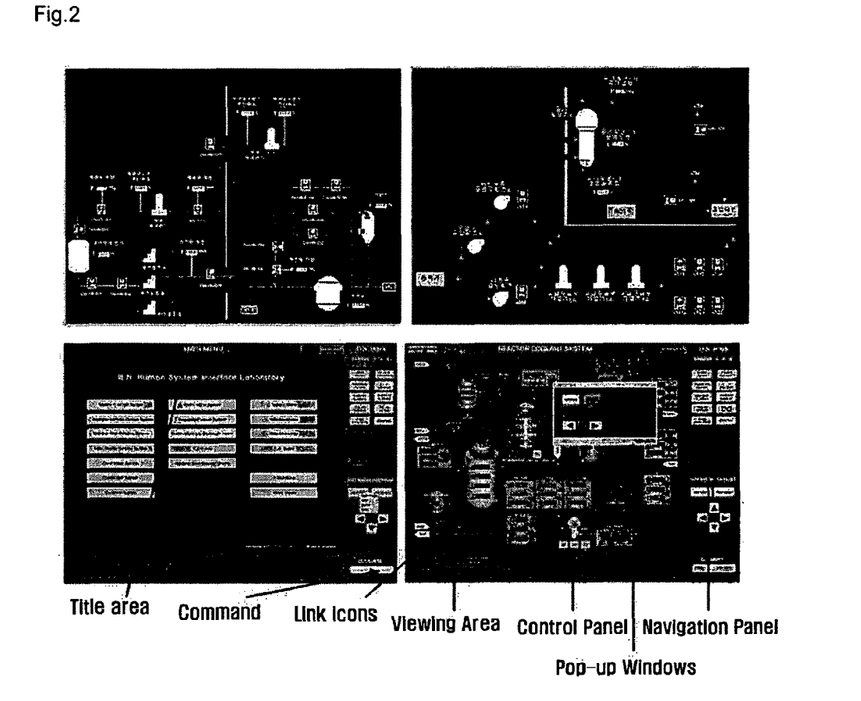
FIG. 2 is a view showing an improved control environment where one or more measuring devices capable of measuring abnormal conditions are provided on a conventional computer screen.

Owing to such problems, there has been a difficulty in applying the technique developed by the patent, since the acquisition difficulties of each abnormal symptom are not the same under an advanced control environment which has been gradually increased with the development of IT techniques as shown in FIG. 2. That is, under a control environment where measuring devices such as a controller, an alarm tile, an indicator and the like are provided on various layers of a computer screen using software.

In other words, in the advanced control environment, there may be differences in the acquisition difficulties of necessary information according to the screen configuration.

For example, if too many entities are displayed on a single screen or there are colors, flashing lights or the like on the screen, then it is strongly expected that the user feel a higher demand due to the acquisition difficulty of information.

SUMMARY OF THE INVENTION

The present invention proposes to solve the above problems. The purpose of the present invention is to provide an apparatus and a method for diagnosing abnormal conditions by quantifying the acquisition difficulties of abnormal symptoms by considering distinctiveness of a measuring device. Through this invention, the acquisition difficulties of abnormal symptoms can be used even under an advanced control environment in which the abnormal symptoms provided on a computer screen.

In order to accomplish the object, the apparatus and the method for diagnosing the abnormal conditions exactly diagnose the abnormal conditions by considering the acquisition difficulty of information displayed on the computer screen under the advanced control environment where a controller, an alarm tile, an indicator and the like are provided on the computer screen using software.

There is provided an apparatus for diagnosing abnormal conditions generated from a system, which provides one or more measuring devices capable of observing abnormal conditions on a computer screen, comprising: a user input arrangement unit receiving and quantifying data including one or more abnormal symptoms, one or more abnormal conditions, generation frequency of the abnormal conditions and AND logic between the abnormal symptoms; an acquisition difficulty calculation unit for each abnormal symptom calculating acquisition difficulties for the abnormal symptoms by quantifying complexity for a computer screen configuration using an excess entropy technique and quantifying distinctiveness according to the complexity; a diagnosis importance calculation unit for each abnormal symptom calculating an importance value for the abnormal symptom using the data; and a Boolean logic application unit for each abnormal symptom selecting an abnormal condition corresponding to the generated abnormal symptom using a sequential diagnosis technique by using the importance value but introducing Boolean logic for the abnormal symptoms having the same importance.

The acquisition difficulty calculation unit for each abnormal symptom may divide an entire screen into a first screen from which the measuring device capable of observing the corresponding abnormal symptom is excluded and a second screen on which only the measuring device capable of observing the corresponding abnormal symptom is included and form screen information structure graphs for the entire screen and each divided screen to calculate a second order entropy for each screen.

The screen information structure graph may be formed for each of the entire screen, the first screen and the second screen, having a tree structure representing the relationship among each screen, the measuring devices included in each screen and the properties of each measuring device.

The properties may include all kinds of information used in classification of the measuring device including shapes and Labels of the measuring devices.

The acquisition difficulty calculation unit for each abnormal symptom may calculate the distinctiveness of each screen using the second order entropy of the screen information structure graph for the entire screen, the second order entropy of the screen information structure graph for the first screen, the second order entropy of the information structure graph for the second screen, and the excess entropy.

Assuming that the second order entropy for the entire screen (B) is H(B), the second order entropy for the first screen (B-1) is H(B-1), the second order entropy for the second screen (B-2) is H(B-2), and the excess entropy is C(S), the distinctiveness (D(B-2)) for the excess entropy and the second screen may be calculated by the equation below:

$$C(S) = H(B-1) + H(B-2) - H(B)$$

$$D(B-2) = \frac{\text{signal}}{\text{noise}} = \frac{H(B-2) - C(S)}{H(B-1) - C(S)}$$

The Boolean logic application unit for each abnormal symptom may connect the abnormal symptoms having the same importance so as to have OR logic when abnormal symptoms having the same importance are abnormal symptoms not having an AND relationship, and the Boolean logic application unit for each abnormal symptom may connect the abnormal symptoms having the same importance so as to have AND logic when abnormal symptoms having the same importance are abnormal symptoms having an AND relationship.

The apparatus for diagnosing abnormal conditions may further comprise: an abnormal condition diagnosis certificate displaying unit displaying an abnormal condition selected by the Boolean logic application unit for each abnormal symptom.

There is provided a method for diagnosing abnormal conditions generated from a system, which provides one or more measuring devices capable of observing abnormal conditions on a computer screen, comprising the steps of: receiving and quantifying data including one or more abnormal symptoms, one or more abnormal conditions, generation frequency of the abnormal conditions and AND logic between the abnormal symptoms; and calculating acquisition difficulties for the abnormal symptoms by quantifying complexity for a computer screen configuration using an excess entropy technique and quantifying distinctiveness according to the complexity. The method may further comprise the step of: calculating an importance value for the abnormal symptom using the data; and selecting an abnormal condition corresponding to the generated abnormal symptom using a sequential diagnosis technique by using the importance value but introducing Boolean logic for the abnormal symptoms having the same importance.

The calculating acquisition difficulties for the abnormal symptoms may comprise dividing an entire screen into a first screen from which the measuring device capable of observing the corresponding abnormal symptom is excluded and a second screen on which only the measuring device capable of observing the corresponding abnormal symptom is included, and forming screen information structure graphs for the entire screen and each divided screen to calculate a second order entropy for each screen.

The screen information structure graph may be formed for each of the entire screen, the first screen and the second screen, having a tree structure representing the relationship among each screen, the measuring devices included in each screen and the properties of each measuring device.

The distinctiveness of each screen may be calculated using the second order entropy of the screen information structure graph for the entire screen, the second order entropy of the screen information structure graph for the first screen, the second order entropy of the information structure graph for the second screen, and the excess entropy.

Assuming that the second order entropy for the entire screen (B) is H(B), the second order entropy for the first screen (B-1) is H(B-1), the second order entropy for the second screen (B-2) is H(B-2), and the excess entropy is C(S), the distinctiveness (D(B-2)) for the excess entropy and the second screen may be calculated by the equation below:

$$C(S) = H(B-1) + H(B-2) - H(B)$$

$$D(B-2) = \frac{\text{signal}}{\text{noise}} = \frac{H(B-2) - C(S)}{H(B-1) - C(S)}$$

The step of selecting the abnormal condition may comprise connecting the abnormal symptoms having the same importance so as to have OR logic when abnormal symptoms having the same importance are abnormal symptoms not having an AND relationship, and connecting the abnormal symptoms having the same importance so as to have AND logic when abnormal symptoms having the same importance are abnormal symptoms having an AND relationship.

The method for diagnosing abnormal conditions may further comprise the step of: displaying an abnormal condition selected by the step of selecting the abnormal condition.

With the apparatus and the method for diagnosing the abnormal conditions according to the present invention, the acquisition difficulty between abnormal symptoms provided on the computer screen are quantitatively considered, making it possible to be used even under the improved control environment, and Boolean logic between abnormal symptoms which are not considered in the sequential diagnosis device is added, making it possible to efficiently diagnose the abnormal conditions even under masking effects that may be generated between the abnormal symptoms and making it possible for a user to rapidly and easily diagnose the abnormal conditions that may be generated from a complicated device.

Also, the improvement of the user's ability to grasp the current condition leads to offer a more appropriate response for the generated abnormal conditions, making it possible to improve the stability of the system.

BRIEF DESCRIPTION OF THE DRAWINGS

These and other objects, features, and advantages of preferred embodiments of the present invention will be more fully described in the following detailed description, taken in conjunction with the accompanying drawings. In the drawings.

DETAILED DESCRIPTION OF THE INVENTION

The present invention will be more apparent from the following detailed description with accompanying drawings.

Hereinafter, the preferred present invention will be described in more detail with reference to the accompanying drawings. When adding reference numerals into constituents in each drawing set forth herein, like reference numerals refer to like elements throughout even they are shown in other drawings. Also, when explaining the present invention, if it is judged that the specific explanation of the related well-known constitution or function may make the gist of the present invention obscure, the detailed explanation thereof will be omitted.

Figure 3:
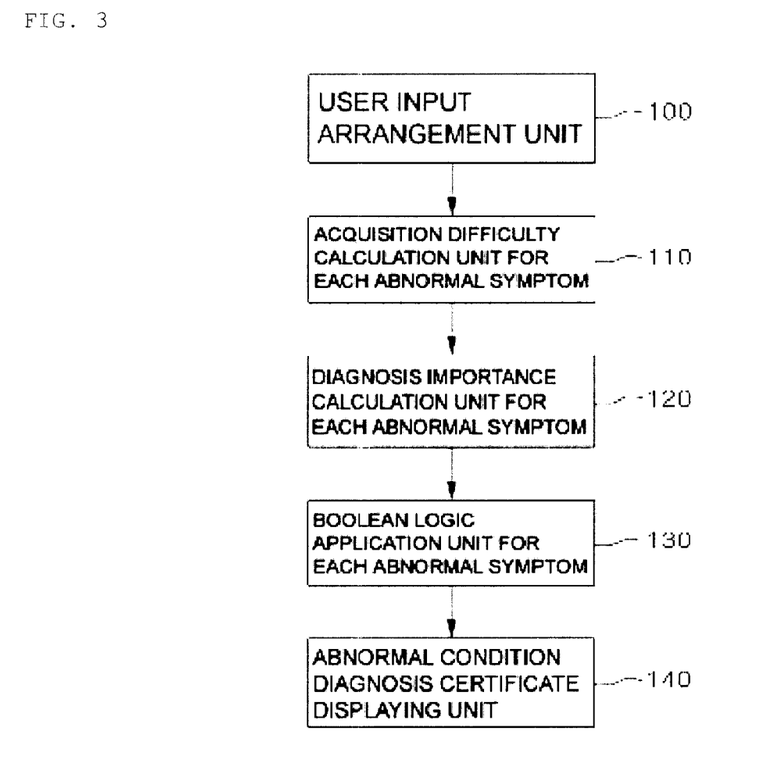
FIG. 3 is a block diagram showing an apparatus for diagnosing abnormal conditions according to a preferred embodiment of the present invention.

FIG. 3 is a block diagram showing an apparatus for diagnosing abnormal conditions according to a preferred embodiment of the present invention.

Referring to FIG. 3, there is provided a method for diagnosing abnormal conditions generated from a system, which provides one or more measuring devices capable of observing abnormal conditions on a computer screen, wherein the system includes a user input arrangement unit 100, an acquisition difficulty calculation unit for each abnormal symptom 110, a diagnosis importance calculation unit for each abnormal symptom 120, a Boolean logic application unit for each abnormal symptom 130, and an abnormal condition diagnosis certificate displaying unit 140.

The user input arrangement unit 100 receives data required for an apparatus for diagnosing abnormal conditions from a user, wherein the data include "abnormal conditions to be diagnosed", "main abnormal symptoms to be observed for each abnormal condition", "generation frequency for each abnormal condition", "AND logic between the main abnormal symptoms" and the like.

The user input arrangement unit 100 standardizes the data received from the user and represents the relationship among the input data using tables. See Tables 1 and 2 below.

TABLE 1

| Abnormal symptoms | Abnormal conditions | | | | | | | Acquisition difficulties for each abnormal symptom |
|---|---|---|---|---|---|---|---|---|
| | $A_1$ | $A_2$ | $A_3$ | $A_4$ | $A_5$ | $A_6$ | $A_7$ | |
| $S_1$ | | | Yes | | | | | $D_1$ |
| $S_2$ | | Yes | Yes | | | | | $D_2$ |
| $S_3$ | | | | Yes | | | | $D_3$ |
| $S_4$ | | | | Yes | | | | $D_4$ |
| $S_5$ | | | | | Yes | Yes | Yes | $D_5$ |
| $S_6$ | | | | | Yes | Yes | Yes | $D_6$ |
| $S_7$ | | | | | Yes | Yes | | $D_7$ |
| $S_8$ | | | | | Yes | Yes | | $D_8$ |
| $S_9$ | | | | | | Yes | | $D_9$ |
| $S_{10}$ | | | | | X | | | $D_{10}$ |
| $S_{11}$ | | | | | X | | | $D_{11}$ |
| Relative generation frequencies for each abnormal symptom | 0.3 | 0.1 | 0.13 | 0.17 | 0.12 | 0.1 | 0.08 | |

(Wherein,

'Yes': When a given abnormal condition is generated, the corresponding abnormal symptom may be observed.

Blank: Even when a given abnormal condition is generated, the corresponding abnormal symptom is not observed.

'X': When a given abnormal condition is generated, the corresponding abnormal symptom may be observed or may not be observed in some cases.)

TABLE 2

| Abnormal condition | Symptoms having 'AND' relation |
|---|---|
| A4 | {S3, S4} |

Table 2 shows an example where abnormal symptoms that must be simultaneously generated for a given abnormal condition are standardized. It can be appreciated that the abnormal symptoms S3 and S4 must be simultaneously generated under the abnormal conditions shown in Table 1.

Referring to Table 1, it can be appreciated that there are seven abnormal conditions (A1 to A7), eleven abnormal symptoms (S1 to S11) that may be observed when the abnormal conditions are generated, generation frequencies for the abnormal conditions (0.3, 0.1, . . . , and 0.08) and acquisition difficulties for each abnormal symptom (D1 to D11) The number of the abnormal conditions and the abnormal symptoms is not limited to that shown in Table 1.

The abnormal conditions (A1 to A7) generally refer to all conditions deviated from a normal condition defined by a user. The abnormal symptoms (S1 to S11) that may be observed when the abnormal conditions (A1 to A7) are generated generally refer to specific symptoms capable of representing each abnormal condition.

And, the generation frequencies for each abnormal condition refer to normalization results of the generation frequencies for each abnormal condition input by the user. The normalization means that the generation frequencies for each abnormal condition are divided by the sum total of the generation frequencies of all abnormal conditions to finally allow the sum of the generation frequencies of all abnormal conditions to be 1.0.

Also, the acquisition difficulties for each abnormal symptom (D1 to D11) are to quantitatively calculate how easily or difficultly the corresponding abnormal symptom may be observed by the user. If each measuring device capable of knowing each abnormal symptom exists on the computer screen, the acquisition difficulty of a specific abnormal symptom varies depending on how easily the measuring device capable of observing the corresponding abnormal symptom can be distinguished from other measuring devices. The acquisition difficulties for each abnormal symptom (D1 to D11) can be calculated by the acquisition difficulty calculation unit for each abnormal symptom 110.

The acquisition difficulty calculation unit for each abnormal symptom 110 divides an entire screen into a first screen from which the measuring device capable of observing the corresponding abnormal symptom is excluded and a second screen on which only the measuring device capable of observing the corresponding abnormal symptom is included. The acquisition difficulty calculation unit for each abnormal symptom 110 forms screen information structure graphs for the entire screen and each divided screen and then calculates a second order entropy for each screen.

And, for the user input arrangement results shown in Table 1, in order to quantitatively evaluate the acquisition difficulties for each abnormal symptom, the complexity for the computer screen design is quantified using an excess entropy technique (see S. N. Mohanty, "Entropy metrics for software design evaluation" and "The Journal of Systems and Software, Vol. 2, pp. 39-46, 1981, and M. H. Van Emden "Hierarchical decomposition of complexity", Machine Intelligence, Vol. 5, pp. 361-380, 1970), and then the distinctiveness of the measuring devices according to the complexity of the screen design is quantified (see A. Tversky, "Features of similarity", Psychological Review, Vol. 84, pp. 327-352, 1977).

In other words, the distinctiveness according to the screen configuration can be calculated using the second order entropy of the screen information structure graph for the entire screen, the second order entropy of the screen information structure graph for the first screen, the second order entropy of the information structure graph for the second screen, and the excess entropy. For example, two computer screens A, B each displaying four measuring devices may be considered as shown in FIG. 4.

Figure 4:
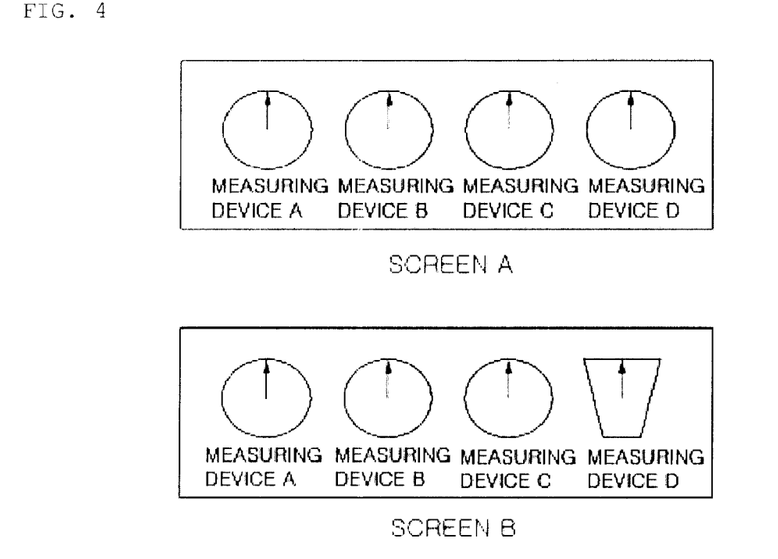
FIG. 4 is a diagram showing distinctiveness of complexity of the screen configuration according to the preferred embodiment of the present invention.

In FIG. 4, "measuring device D" shown on the screen B on which the abnormal symptoms can be observed is much more easily conceived rather than "measuring device D" shown on the screen A. This is because of the reason that the "measuring device D" on the screen B has a different shape from other measuring devices whereby having a high distinctiveness, whereas the "measuring device D" on the screen A has the same shape as other measuring devices to have a relatively low distinctiveness.

Figure 5:
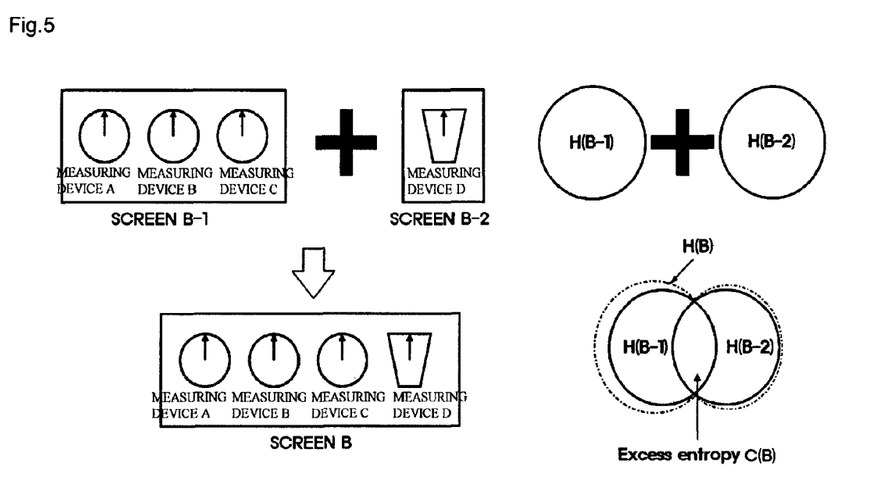
FIG. 5 is a Venn diagram for the measuring device D on the screen B according to the preferred embodiment of the present invention.

Also, the excessive entropy may be described in detail through a Venn diagram of FIG. 5. Referring to FIG. 5, assuming that the screen B is a combined screen of two virtual screens (B-1, B-2), in view of entropy the distinctiveness D (B-2) on the screen B-2 will be defined using the equation below.

$$D(B-2) = \frac{\text{signal}}{\text{noise}} = \frac{H(B-2) - C(S)}{H(B-1) - C(S)} \quad \text{[Equation 1]}$$

Referring to equation 1 described above, it can be appreciated that as the signals used in dividing the screen B-2 are more, the distinctiveness of the screen B-2 is increased. However, as the noise is more, the distinctiveness of the screen B-2 is decreased.

In other words, such a distinctiveness is determined by the excess entropy C(S), which corresponds to the common signals between the screen B-1 and screen B-2 constituting the screen B. The excess entropy can be defined using equation 2 below.

$$C(S) = H(B-1) + H(B-2) - H(B) \quad \text{[Equation 2]}$$

Therefore, entropies for each screen are calculated in order to calculate the distinctiveness, and the second order entropy of a graph is used therefor (see J. S. Davis and R. J. Leblanc, "A Study of the applicability of complexity measures", IEEE Transactions on Software Engineering, Vol. 14, No. 9, pp. 1366-1372, 1988 and 20., K. S. Lew et al., "Software complexity and its impact on software reliability", IEEE Transactions on Software Engineering, Vol. 14, No. 11, pp. 1645-1655, 1988).

Figure 6:
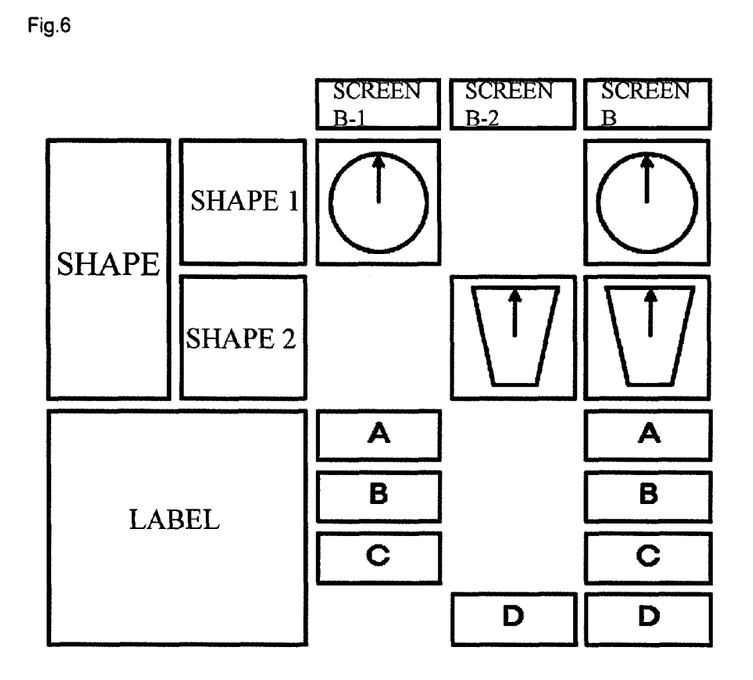
FIG. 6 is a diagram comparing the properties of the measuring devices included in each screen according to the preferred embodiment of the present invention.
Figure 7:
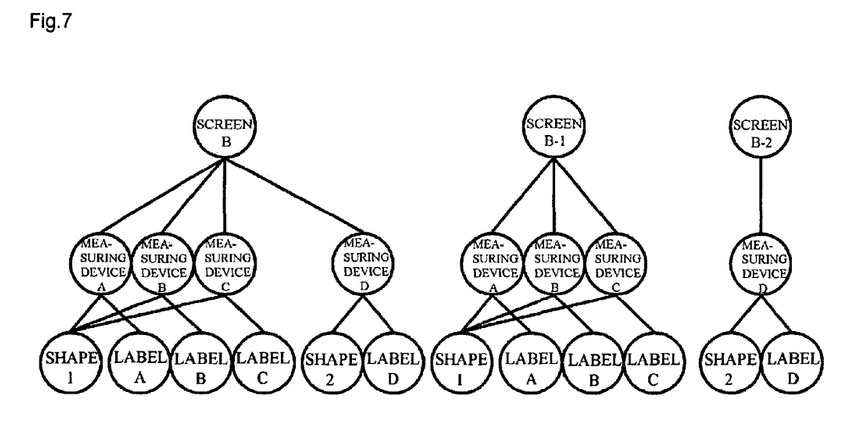
FIG. 7 is a diagram showing screen information structure graphs for each screen according to the preferred embodiment of the present invention.

After arranging the properties of each measuring device as shown in FIG. 6, the second order entropy can draw up screen information structure graphs as shown in FIG. 7 based thereon. The screen information structure graphs can represent the relationship between the measuring devices included in each screen and the properties of each measuring device using a tree structure.

For example, as shown in FIG. 6, the screen B-2 has "measuring device D" and the "measuring device D" has properties of "shape 2" and "label D", such that the screen B-2 may be constituted in a screen information graph structure of FIG. 7. The screen B-1 may be constituted in a screen information graph structure wherein the property of "shape 1" is shared by all three measuring devices.

Figure 8:
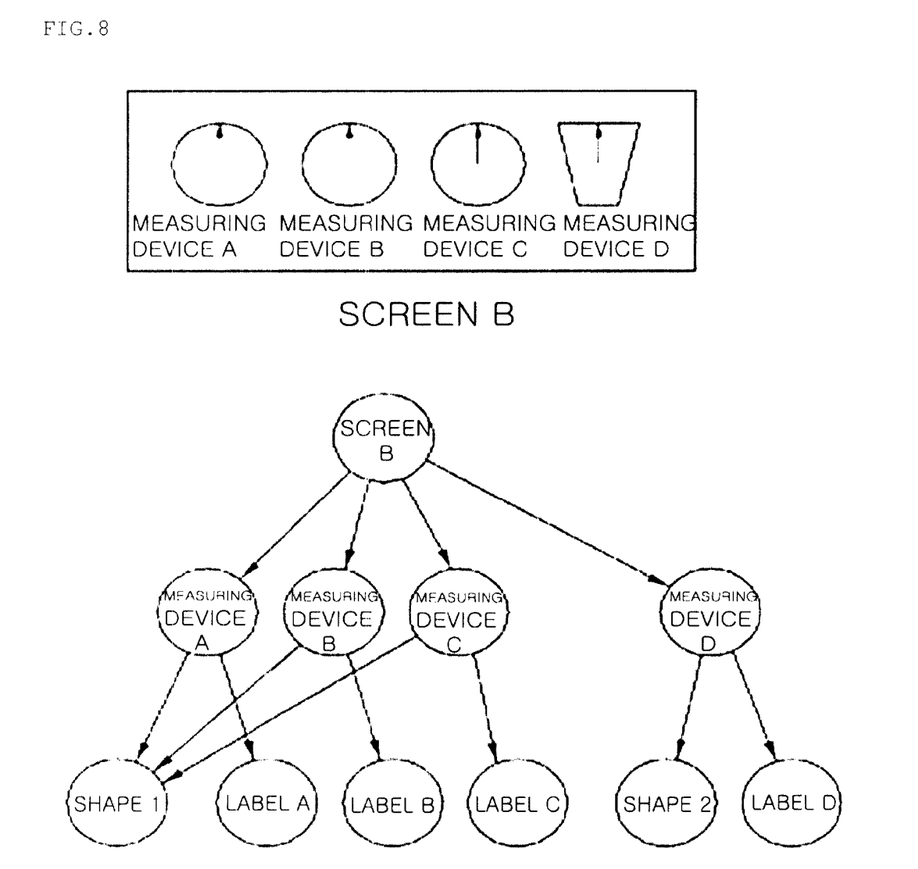
FIGS. 8 to 10 are diagrams showing distinctiveness calculation results for each measuring device on the screen B according to the preferred embodiment of the present invention.
Figure 9:
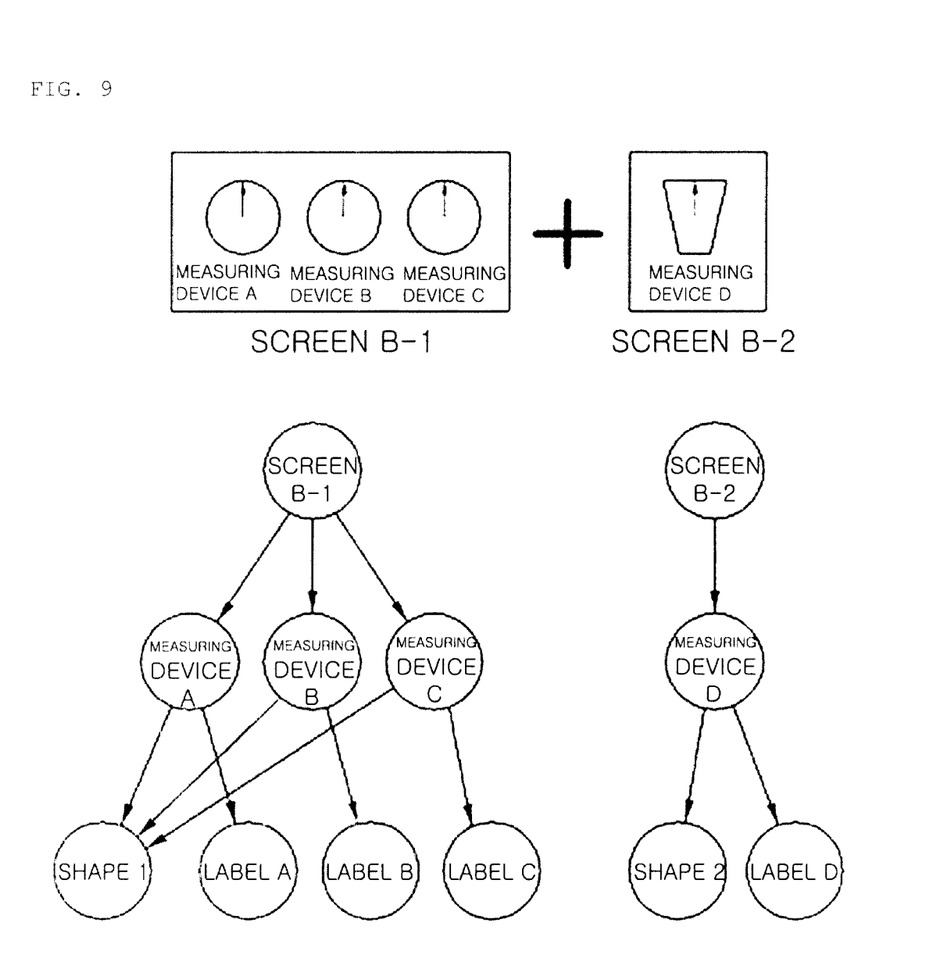

FIG. 8 shows a screen information structure graph for an entire screen B on which various measuring devices are displayed. FIG. 9 shows screen information structure graphs divided into a screen B-1 on which measuring devices other than "measuring device D" observing abnormal symptoms are included and a screen B-2 on which the "measuring device D" obtaining an acquisition difficulty is included.

The second order entropies of the entire screen and each divided screen H(B), H(B-1) and H(B-2) are obtained using the screen structure information graph of the entire screen B and the screen structure information graphs of each divided screen B-1 and B-2. The excess entropy C(S) is obtained using equation 2 described above with these values. As shown in Table 3 below, the distinctiveness of the screen B-2, that is, the distinctiveness of "measuring device D", can be obtained by substituting the obtained values H(B), H(B-1), H(B-2) and C(S) in equation 1 described above, wherein it refers to the acquisition difficulty of the corresponding abnormal symptom.

And, when obtaining the distinctiveness of other measuring devices, the acquisition difficulties of abnormal symptoms can be obtained in the same manner.

Figure 10:
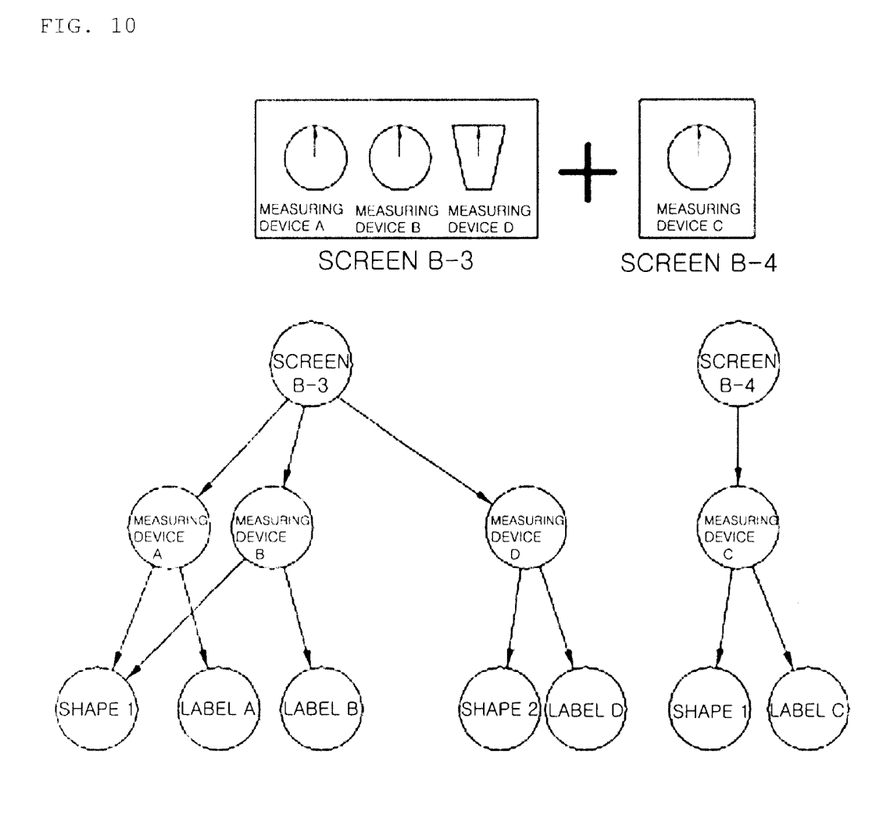

For example, when a measuring device capable of observing an abnormal symptom is "measuring device C", as shown in FIG. 10, the entire screen B of FIG. 8 is divided into a screen B-3 on which measuring devices other than the "measuring device C" are included and a screen B-4 on which the "measuring device C" obtaining an acquisition difficulty is included. And then, the second order entropies of the entire screen and each divided screen H(B), H(B-3) and H(B-4) are obtained using the screen structure information graph for the entire screen B and the screen structure information graphs for each divided screen B-3 and B-4, and the excess entropy C(S) is obtained using equation 2 described above with these values.

The values H(B), H(B-3), H(B-4) and C(S) obtained as above are substituted in equation 1 described above, such that the distinctiveness of the screen B-4, that is, the distinctiveness of "measuring device C", can be obtained as shown in Table 3. And, the measuring devices A and B have the same shape with the measuring device C, such that the measuring devices A and B have the same distinctiveness with the measuring device C.

TABLE 3

| H(B)   | 3.278  |
|--------|--------|
| H(B-1) | 2.75   |
| H(B-2) | 0.8113 |
| C(S)   | 0.2833 |

⇩

Distinctiveness for each measuring device

| Measuring device A | 0.134  |
|--------------------|--------|
| Measuring device B |        |
| Measuring device C |        |
| Measuring device D | 0.214  |

⇧

| H(B)   | 3.278  |
|--------|--------|
| H(B-3) | 2.948  |
| H(B-4) | 0.8113 |
| C(S)   | 0.4813 |

Referring to Table 3 described above, it can be appreciated that the distinctiveness of "measuring device D" can be more easily distinguished by a degree of 58% compared to other measuring devices. It can be also appreciated that such a result corresponds to the intuitive observation felt by ordinary people.

Therefore, when the distinctiveness for each measuring device calculated in this manner is introduced into "the acquisition difficulties for each abnormal symptom" of Table 1, the difficulty of information acquisition according to the complexity of the screen may be considered. The distinctiveness obtained in this manner becomes the values meaning the acquisition difficulty of the corresponding abnormal symptom.

The diagnosis importance calculation unit for each abnormal symptom 120, which calculates diagnosis importance values for all abnormal symptoms included in Table 1, calculates the diagnosis importance to determine check orders of abnormal symptoms for a user's effective diagnosing of abnormal conditions, wherein the importance calculation will be described using equation 3 below.

$$\text{Diagnosis importance} = -P \times \frac{\begin{pmatrix} P_y \times \log_2 P_y + \\ P_n \times \log_2 P_n \end{pmatrix}}{D_j} \quad \text{[Equation 3]}$$

(Wherein P: When $j^{th}$ symptom is observed, the probability that the $j^{th}$ symptom can divide abnormal conditions=1.0−(Sum of relative generation frequencies of abnormal conditions indicated as "X" for the $j^{th}$ symptom).

$P_y$: When $j^{th}$ symptom is observed, the probability that the $j^{th}$ symptom can indicate the generation of certain abnormal condition=1.0−(Sum/P of relative generation frequencies of abnormal conditions indicated as "Yes" for the $j^{th}$ symptom).

$P_n$: When $j^{th}$ symptom is observed, the probability that the $j^{th}$ symptom can not indicate the generation of certain abnormal condition=1−$P_y$.

$D_j$: Acquisition difficulty for $j^{th}$ symptom.)

The Boolean logic application unit for each abnormal symptom 130 uses the importance calculated in the diagnosis importance calculation unit for each abnormal symptom 120 but introduces Boolean logic for the abnormal symptoms having the same importance to respond to the abnormal symptoms generated through the sequential diagnosis technique, thereby selecting abnormal conditions.

Figure 11A:
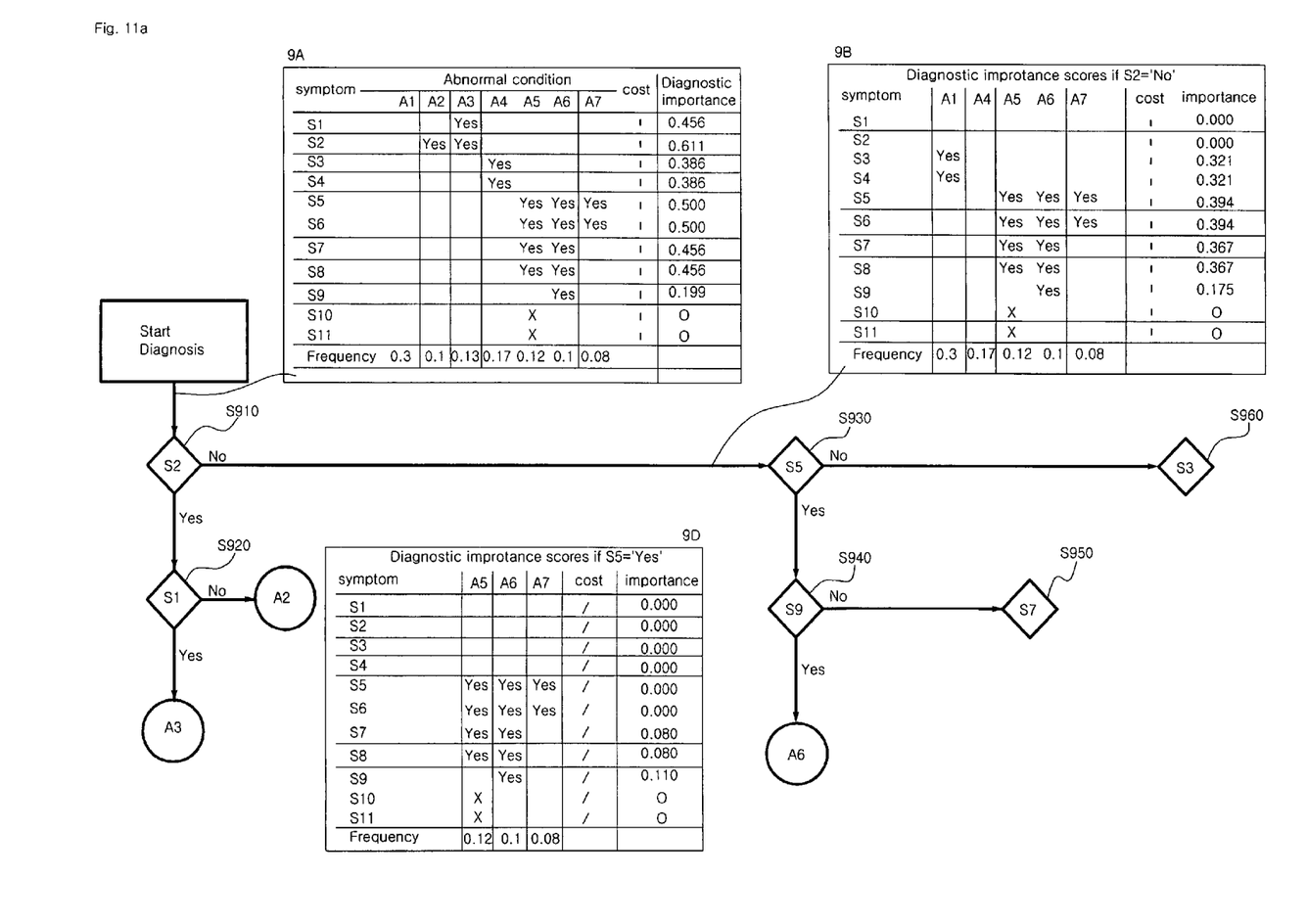
FIGS. 11a and 11b (referred to collectively hereafter as "FIG. 11") form a diagram showing a technique to select abnormal conditions using a sequential diagnosis technique according to the preferred embodiment of the present invention.
Figure 11B:
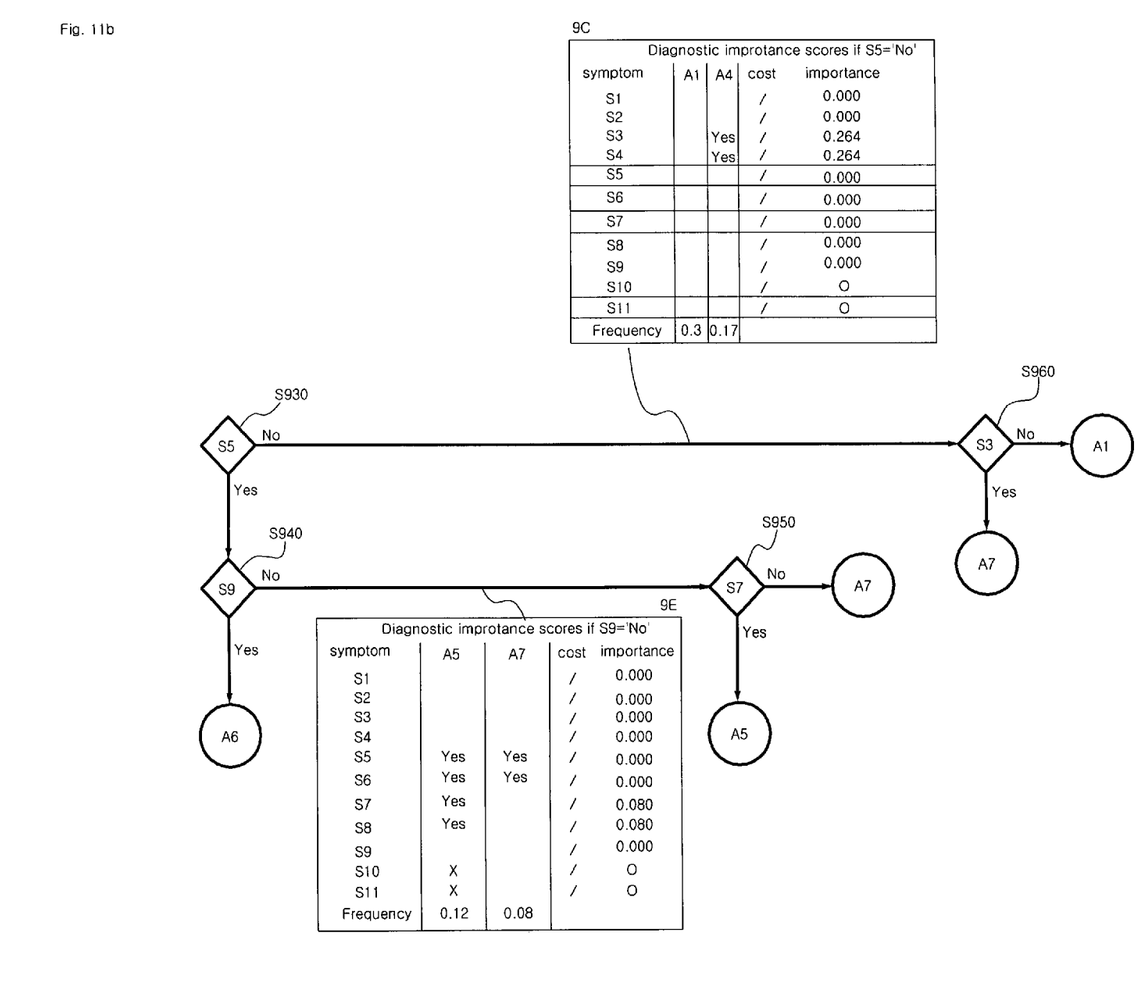

The Boolean logic application unit for each abnormal symptom 130 may be explained with reference to FIGS. 11 and 12. FIG. 11 shows processes to select the abnormal conditions responding to the abnormal symptoms generated through the sequential diagnosis technique.

Referring to FIG. 11, if an abnormal condition diagnosis starts, as shown in 9A (9A refers to the result performed in a diagnosis importance calculation unit for each abnormal symptom), a diagnosis importance for each symptom of an S2 symptom is the highest so that whether an S2 symptom is generated or not is checked in order to diagnose the abnormal conditions (S910).

If the S2 symptom is generated from the step S910, whether the S1 symptom is generated or not is checked (S920), and if S1 symptom is generated, abnormal condition A3 is selected. If the S1 symptom is not generated, abnormal condition A2 is selected.

If the S2 symptom is not generated in the step S910, any one of abnormal symptoms related to {A1, A4, A5, A6 and A7} than abnormal symptoms related to {A2 and A3} can be selected and checked.

In step S930, as shown in 9B (9B refers to the result performed in a diagnosis importance calculation unit for each abnormal symptom), a diagnosis importance for each symptom of S5 and S6 symptoms is the highest so that whether an S5 or S6 symptom is generated or not is checked in order to diagnose the abnormal conditions.

However, the object of application in the sequential diagnosis technique is to provide a binary tree capable of diagnosing abnormal conditions. Accordingly, there is no need to clarify the processing technique for the symptoms having the same diagnosis importance, that is, it is sufficient to consider only one symptom among the repeated symptoms, such that only whether the S5 symptom preceding the S6 symptom is generated can be checked.

If the S5 symptom is generated in the step S930, whether an S9 symptom is generated or not is checked (S940).

If the S9 symptom is generated in the step S940, abnormal condition A6 is selected, and if the S9 symptom is not generated in the step S940, whether an S7 or S8 symptom is generated or not is checked (S950).

In the sequential diagnosis technique only whether the S7 symptom preceding the S8 symptom is generated or not is checked as described in the step S930. Therefore, if the S7 symptom is not generated in the step S950, abnormal condition A7 is selected, and if the S7 symptom is generated in the step S950, abnormal condition A5 is selected.

At this time, the abnormal symptoms indicated as "X" for the A5 are symptoms that may be observed or may not be observed when the A5 is generated, such that they do not need to be directly considered for selecting the A5.

If the S5 symptom is not generated in the step S930, any one of abnormal symptoms related to two abnormal conditions related to {A1 and A4} other than abnormal symptoms related to {A5, A6 and A7} can be selected and checked.

As shown in 9C (9C refers to the result performed in a diagnosis importance calculation unit for each abnormal symptom), a diagnosis importance for each symptom of S3 and S4 symptoms is the highest so that whether an S3 or S4 symptom is generated or not is checked in order to diagnose the abnormal conditions (S960).

However, when using the sequential diagnosis technique as described in the step S930, only whether the S3 symptom preceding the S4 symptom is generated or not is checked.

If the S3 symptom is generated in the step S960, abnormal condition A4 is selected, and if the S3 symptom is not generated in the step S960, abnormal condition A1 is selected.

The diagnosis importance calculations for the abnormal symptoms are repeated until all of the abnormal conditions can be checked from the step S910 to the step S960, and the final result obtained using the sequential diagnosis technique may be obtained as any one of the shown A1 to A7.

In the present invention, seven abnormal conditions of A1 to A7 are shown, however the number thereof is not limited thereto.

Figure 12:
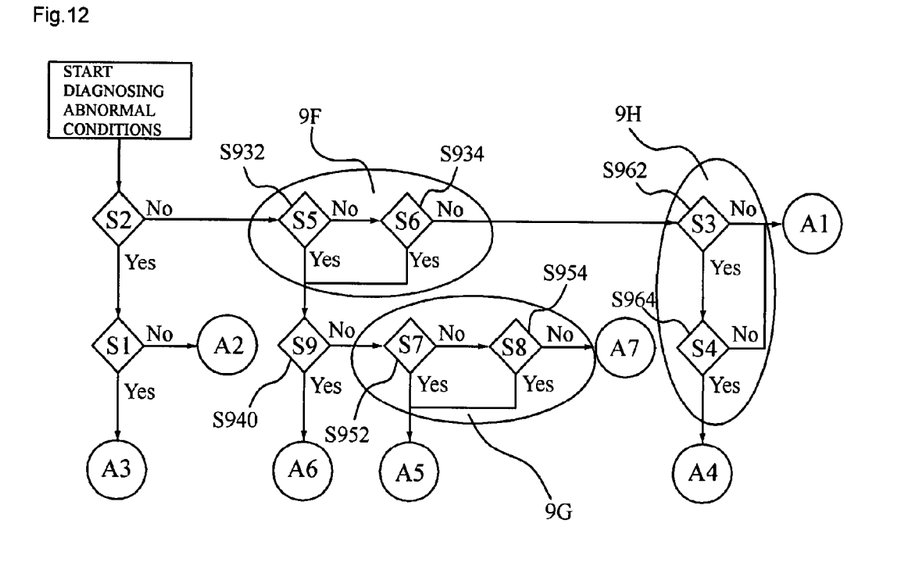
FIG. 12 is a diagram showing a technique to select abnormal conditions using a sequential diagnosis technique by introducing Boolean logic according to the preferred embodiment of the present invention.

FIG. 12 shows a diagram introducing Boolean logic to abnormal symptoms having the same importance when abnormal symptom S5, S7 or S3 is not shown due to masking effects in the sequential diagnosis technique, where abnormal symptoms having the same diagnosis importance are not considered, as shown in 9B, 9C and 9E of FIG. 11, in order to solve the problem that the abnormal conditions for the abnormal symptoms cannot be selected.

For example, for a storage tank in which a water level should be always maintained above a predetermined level, when the masking effects assumes that a controller automatically controlling flow rate of liquid flowed into a storage tank according to the current water level of the storage tank is connected to the storage tank and assumes that the abnormal symptom S7 and the abnormal symptom S8 are "Water level of the storage tank is decreasing" and "Flow rate flowed into the storage tank is increasing", respectively, if the abnormal condition A5 is defined as "breakage of the storage tank", it is improper to check A5 only with the S7.

In other words, although the S7 may be observed under the A5 situation, when the controller automatically increases the flow rate as the water level of the broken storage tank lowers, the S7 may be hidden due to the increased flow rate. Accordingly, S8 in addition to the S7 should be additionally considered in order to select the exact abnormal condition.

Therefore, in order to solve the problem of the masking effects described above, in the abnormal Boolean logic application unit 130 introducing Boolean logic for the abnormal symptoms having the same importance, if the abnormal symptoms do not have an 'AND' relationship (S3 and S4 of 2B in FIG. 2) with the abnormal symptoms S5 and S6, S7 and S8, S3 and S4 having the same diagnosis importance as shown in 9B, 9C and 9E, the abnormal symptoms are connected to 9F and 9G so as to have 'OR' logic, and if not, the abnormal symptoms are connected to 9H so as to have 'AND' logic.

Reviewing the portion in FIG. 12 not overlapping with FIG. 11, as shown in 9B, the diagnosis importance for each symptom of S5 and S6 symptoms is the highest so that whether the S5 or S6 symptom is generated or not is checked in order to diagnose the abnormal condition. At this time, whether the S5 symptom is generated or not is first checked (S932), and if the S5 symptom is not generated, whether the S6 symptom is generated or not is checked (S934).

In the steps of S932 and S934, if any one of the S5 symptom and the S6 symptom is generated, whether an S9 symptom is generated or not is checked (S940). If the S9 is generated, A6 is selected, and if the S9 is not generated, whether an S7 or S8 symptom is generated or not is checked as shown in FIG. 9G.

And, in the steps of S932 and S934, if both the S5 symptom and the S6 symptom are not generated, any one of abnormal symptoms related to two abnormal conditions related to {A1 and A4} other than abnormal symptoms related to {A5, A6 and A7} can be selected and checked.

In other words, the S5 and the S6 are connected in order to have the 'OR' logic, making it possible to perform more exact diagnosis compared to the case when the abnormal symptom S5 is not generated due to the masking effects.

And, the steps of S932 and S934 can be applied to the steps of S952 and S954 shown for the S7 and S8 in the same manner 9G.

In 9H, when the S3 is generated, an abnormal condition diagnosis certificate does not immediately show an abnormal condition A4 but checks whether S4 is generated or not (S964). If the S4 is generated, the abnormal condition A4 is selected, and if the S4 is not generated, A1 is selected.

In other words, the abnormal condition A4 is shown only when both the S3 and the S4 are generated, and the abnormal condition A1 is selected in other cases so that the S3 and S4 can have the AND logic in 9H, making it possible to perform more exact diagnosis.

Tables 4, 5 and 6 below show examples to which Boolean logic is applied, wherein in each of the tables, diagnosis item 1 represents a case when the corresponding symptom is generated and diagnosis item 0 represents a case when the corresponding symptom is not generated.

TABLE 4

| S5 | S6 | |
|---|---|---|
| 0 | 0 | 0 |
| 0 | 1 | 1 |
| 1 | 0 | 1 |
| 1 | 1 | 1 |

The table 4 represents a case when S5 and S6 have 'OR' logic, wherein it can be appreciated that when any one of the S5 and S6 is generated, the result becomes 1. In other words, it can be appreciated that if the result becomes 1, a step to check whether the S9 is generated or not is performed, and if the result becomes 0, a step to check whether the S3 is generated or not is performed.

TABLE 5

| S7 | S8 | |
|---|---|---|
| 0 | 0 | 0 |
| 0 | 1 | 1 |
| 1 | 0 | 1 |
| 1 | 1 | 1 |

The table 5 represents a case when S7 and S8 have 'OR' logic, wherein it can be appreciated that when any one of the S7 and S8 is generated, the result becomes 1. In other words, it can be appreciated that if the result becomes 1, a step to select the abnormal condition A5 is performed, and if the result becomes 0, a step to the abnormal condition A7 is performed.

TABLE 6

| S3 | S4 | |
|---|---|---|
| 0 | 0 | 0 |
| 0 | 1 | 0 |
| 1 | 0 | 0 |
| 1 | 1 | 1 |

The table 6 represents a case when S3 and S4 have 'AND' logic, wherein it can be appreciated that when any one of the S3 and S4 is not generated, the result becomes 0. In other words, it can be appreciated that if the result becomes 0, a step to select the abnormal condition A1 is performed, and if the result becomes 1 (both the S3 and S4 are generated), a step to the abnormal condition A4 is performed.

The abnormal condition diagnosis certificate displaying unit 140 provides the abnormal condition diagnosis certificate showing the abnormal condition selected by the Boolean logic application unit for each abnormal symptom 130 to a user.

In other words, the abnormal condition diagnosis certificate displaying unit 140 converts and displays the results obtained by the diagnosis importance calculation unit for each abnormal symptom 120 and the Boolean logic application unit for each abnormal symptom 130 into a flow chart type.

Figure 13:
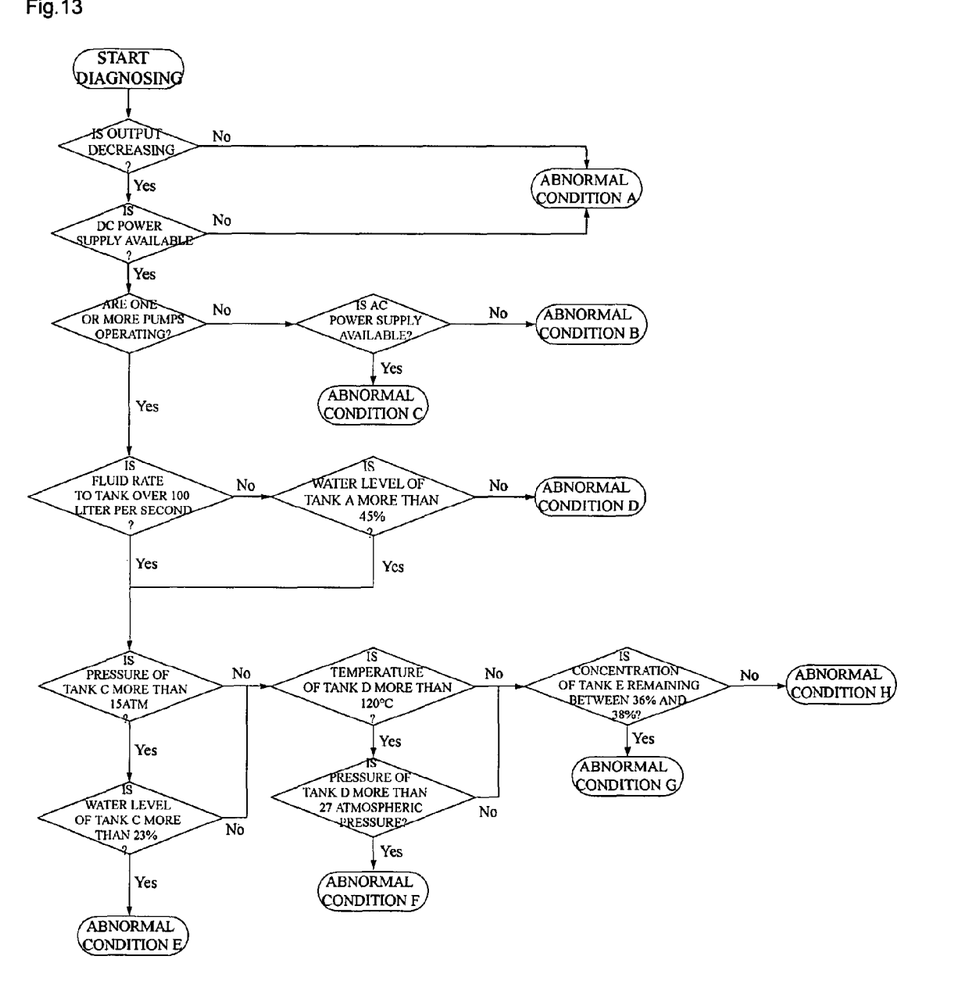
FIG. 13 is a flowchart showing a diagnosis certificate of abnormal conditions displayed to a user according to the preferred embodiment of the present invention.

FIG. 13 shows an example of an abnormal condition diagnosis certificate converted into a flowchart type and displayed to a user, wherein direct current or alternate current power supply for a tank, operation of a pump, flow rate of the tank, a water level, pressure, temperature and concentration are shown using abnormal conditions A to H.

Although the present invention has been described in detail reference to its presently preferred embodiment, it will be understood by those skilled in the art that various modifications and equivalents can be made without departing from the spirit and scope of the present invention, as set forth in the appended claims.

What is claimed is:

1. A method for diagnosing abnormal conditions generated from a system, which provides one or more measuring devices capable of observing abnormal conditions on a computer screen, comprising:
    receiving and quantifying data including two or more abnormal symptoms, one or more abnormal conditions, generation frequency of the abnormal conditions;
    applying AND logic between the abnormal symptoms;
    calculating acquisition difficulties for the abnormal symptoms by quantifying complexity for a computer screen configuration using an excess entropy technique and quantifying distinctiveness according to the complexity;
    calculating an importance value for the abnormal symptom using the data; and
    selecting an abnormal condition corresponding to the generated abnormal symptom using a sequential diagnosis technique by using the importance value but introducing Boolean logic for the abnormal symptoms having a same importance.

2. The method of claim 1, wherein the calculating acquisition difficulties for the abnormal symptoms comprises calculating a distinctiveness of each screen using a second order entropy of a screen information structure graph for an entire screen, a second order entropy of the screen information structure graph for a first screen, a second order entropy of an information structure graph for second screen, and the excess entropy.

3. The method of claim 2, wherein the second order entropy divides an entire screen into a first screen from which a measuring device capable of observing a corresponding abnormal symptom is excluded and a second screen on which only the measuring device capable of observing the corresponding abnormal symptom is included and, wherein the method forms screen information structure graphs for the entire screen and each divided screen to be calculated for each screen.

4. The method of claim 3, wherein the screen information structure graph formed for each of the entire screen, the first screen and the second screen, has a tree structure representing the relationship among each screen, the measuring devices associated with each screen and properties of each measuring device.

5. The method of claim 4, wherein the properties include shapes and labels of the measuring devices.

6. The method of claim 2, wherein the second order entropy for the entire screen (B) is H(B), the second order entropy for the first screen (B-1) is H (B-1), the second order entropy for the second screen (B-2) is H(B-2), and the excess entropy is C(S), the distinctiveness (D (B-2)) for the excess entropy of the second screen is calculated by the equations:

$$C(S) = H(B-1) + H(B-2) - H(B)$$
$$D(B-2) = \frac{\text{signal}}{\text{noise}} = \frac{H(B-2) - C(S)}{H(B-1) - C(S)}$$

7. The method of claim 1, wherein the selecting the abnormal condition comprises connecting the abnormal symptoms having the same importance so as to have OR logic when abnormal symptoms having the same importance are abnormal symptoms not having an AND relationship, and connecting the abnormal symptoms having the same importance so as to have AND logic when abnormal symptoms having the same importance are abnormal symptoms having an AND relationship.

8. The method of claim 1, further comprising:
    displaying an abnormal condition selected by the selecting the abnormal condition.

* * * * *